(No Model.) 2 Sheets—Sheet 2.
F. B. HARVEY.
HARROW AND ROLLER.
No. 490,198. Patented Jan. 17, 1893.
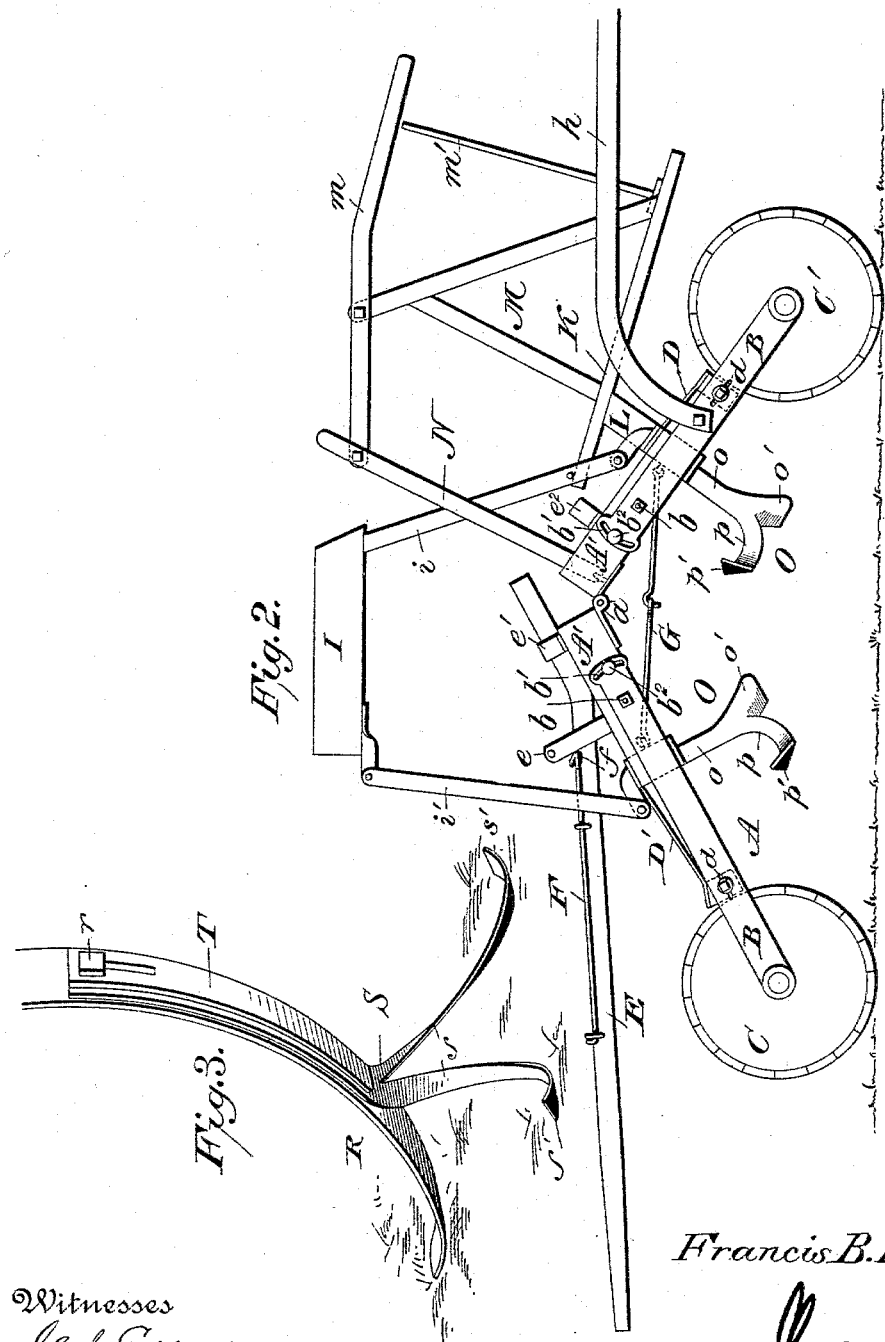
Francis B. Harvey.
Inventor

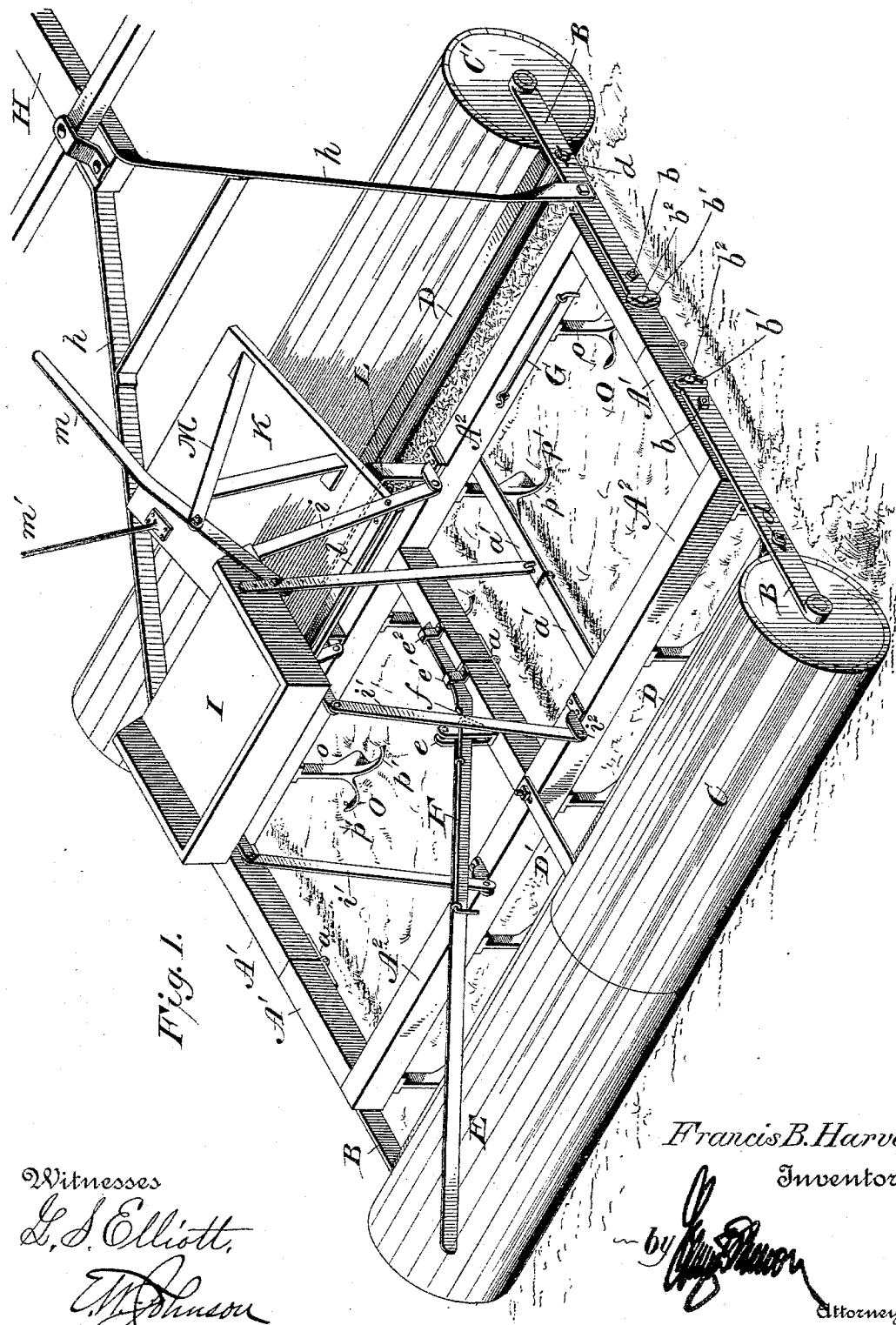

UNITED STATES PATENT OFFICE.

FRANCIS B. HARVEY, OF ATGLEN, PENNSYLVANIA.

HARROW AND ROLLER.

SPECIFICATION forming part of Letters Patent No. 490,198, dated January 17, 1893.

Application filed March 31, 1892. Serial No. 427,212. (No model.)

*To all whom it may concern:*

Be it known that I, FRANCIS B. HARVEY, a citizen of the United States of America, residing at Atglen, in the county of Chester and State of Pennsylvania, have invented certain new and useful Improvements in Harrows and Rollers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in combined harrows and rollers.

The object of the invention is to provide a harrow frame to which rollers are attached of such construction that the harrow may be raised to free it from débris or when it is desired to transport the same without causing the teeth to enter the soil; such a harrow and roller being provided with a seat and means for elevating or depressing the harrow frame either from the seat or ground; and the invention consists in the construction and combination of the parts, as will be hereinafter fully set forth and particularly pointed out in the claims.

In the accompanying drawings forming part of this specification: Figure 1 is a perspective view showing the invention arranged in a position for use. Fig. 2 is a side elevation showing the harrow frame elevated so that the teeth will be out of contact with the soil. Fig. 3 is a detail view of a spring tooth.

A designates the harrow frame, which is made up of two transverse sections centrally connected to each other by hinges $a$ $a$, the leaves of which are attached to the undersides of the beams A' forming part of the harrow sections. The longitudinal beams $A^2$ carry the harrow or cultivator teeth. The harrow frame is also provided with a transverse bar $a'$, which is hinged centrally and rigidly secured to the beams $A^2$.

B B designate bars which extend from the corners of the harrow frame and to which the rollers C C' are journaled, said bars being pivoted by means of bolts $b$ to the side beams A'. The inner ends of these bars are provided with segmental slots, $b'$, through which pass headed bolts $b^2$ into the side beams. Each pair of bars B B is connected to each other by scrapers the ends of which are bent and apertured for the reception of bolts which pass through slots $d$ in the bars adjacent to the rollers, so that said scrapers can be adjusted to and from the rollers. These scrapers are further braced by straps or connections D', which extend from the center of the scraper to the beams $A^2$ at which point they are slotted to receive the proper adjustment.

E designates a lever, which is suitably bent at its lower end and passes through a bifurcated standard $e$ in which it is free to slide, the forward part of said lever passing through loops $e'$ and $e^2$ carried by the center beams of the harrow sections. The loop or guide $e'$ is comparatively near the forward end of the central beam carried by the rear harrow section, while the loop $e^2$ is some distance from the end of the opposite beam. This lever has a notch $f$ located in advance of the bifurcated standard with which the bent end of a bifurcated rod F is adapted to engage, and when said rod is in engagement with the lever the bent end thereof will prevent said lever being operated. By drawing the lever rearward it can be disengaged from the loop $e^2$, and when so disengaged by depressing upon the rear end of the lever the harrow sections may be elevated to the position shown in Fig. 2 of the drawings so as to relieve the teeth from any débris or trash which may have caught thereon. When it is desired to keep the harrow sections elevated, as in transporting the harrow and roller, the hooks or rods G carried by the side beams $A^2$ are caused to engage with each other, as shown in Fig. 2.

H designates the draft pole or tongue, which is connected by means of strips $h$ $h$ to the bars B B located at the forward end of the harrow.

With the parts hereinbefore referred to it is not essential to employ the hinged strip $a'$; but said strip serves a useful purpose in connection with the seat I or foot rest K, which parts I will proceed to describe. The seat I is supported by the front standards $i$ $i$, which are pivotally connected to brackets secured to the beam $A^2$ of the harrow frame and are rigidly secured to the seat. The rear standards, $i'$ $i'$, are pivoted at their upper ends to the seat and at their lower ends to brackets rigidly secured to the rear beam A². By providing pivotal connections as shown the harrow sections may be raised or lowered and the seat remain in a horizontal position.

The foot rest K is pivotally connected to the seat standards $i\ i$ by means of the crossbar $l$ and normally rests upon a raised support L attached to the front beam A². This foot rest carries a suitable support or bracket M to which is fulcrumed a lever $m$, the rear end of said lever being held in engagement with a rod N pivotally connected to one of the members of the hinged rod $a'$. The foot rest also carries a standard $m'$, which the operator can grasp to steady himself when he stands on the front end of the foot-rest to use his weight to tilt said foot-rest and elevate the harrow sections, the support L acting as a fulcrum and the lever $m$ being operated at the same time. By resuming his seat and releasing the lever $m$ the operator will bring the harrow to its normal position.

In connection with the harrow hereinbefore described I employ teeth, O, which are secured in any suitable manner to the longitudinal beams A². The standard $o$ of this tooth extends down below the plane of the wings $p$, and this extension $o'$ of the tooth is narrow and enters the soil before the wings do, and entering the soil to a greater depth than the wings serves to keep the tooth steady and preserve the proper line of draft when in use. Each tooth is provided with rearwardly projecting wings $p$, which incline from their rear edges downward and are bent slightly at their ends where they are to provide the rearward extensions $p'$. The ends of the wings of the teeth are slightly elevated and effectively pulverize the earth, and by such construction the earth is not thrown beyond the track of the teeth but is thrown toward the center portion thereof. The tooth described is attached to the harrow frame preferably as described in my prior patent dated June 10, 1890, in which the teeth are pivoted to the harrow frame so as to turn laterally upon their pivots, said teeth having rearwardly diverging wings with extended portions adjacent to the rear ends thereof. The tooth in the present instance differs in what the front portion is comparatively narrow and has a front cutting and guiding portion with wings having inwardly bent ends.

R designates a spring tooth which may be attached to the harrow frame instead of the style or form of tooth shown in Figs. 1 and 2 of the drawings. The upper portion of this spring tooth is of ordinary construction, and to near the lower portion of the same, by a bolt $r$, is attached a spring plate S, which is bifurcated at its lower end; the furcated portions thereof being extended rearwardly and downwardly to form members $s$ having upwardly turned ends $s'$ which act upon the soil in the same manner as the members $p$ and $p'$ of the style of tooth shown in Figs. 1 and 2.

It will be noted that the point of the tooth will operate in the soil the same as the point $o'$. Rear of the plate S is secured a reinforcing plate T, which is slotted to correspond with the slot in the upper portion of the plate having the diverging blades, so that the plate and portion S may be adjusted as the tooth wears away. This plate will hold the part having the diverging wings firmly against the spring tooth and prevent rearward movement thereof independent of said tooth.

Having thus described my invention, what I claim as new, and desire to secure by Letters-Patent, is:

1. In a harrow and roller, the combination of a harrow frame divided transversely into front and rear sections, hinges $a$ for connecting the sections to each other so that the center portions thereof may have an upward movement, and means substantially as shown for holding the sections in rigid engagement with each other, each section carrying front and rear rollers, substantially as shown and for the purpose set forth.

2. In a harrow and roller, the harrow frame divided transversely into front and rear sections, said sections being pivotally hinged to each other and provided with a sliding bolt or bar the lower end of which engages with loops carried by the central bar of each section of the harrow frame for holding them in rigid engagement with each other, bars B B pivoted to the sections, rollers journaled to said bars, and a draft tongue pivoted to the forward bars, substantially as shown, and for the purpose set forth.

3. In combination with a harrow frame made up of sections hinged to each other as shown, a sliding bolt for holding said sections rigidly on a line with each other, bars B B pivoted to the harrow sections, rollers journaled to said bars, and scrapers carried by the bars in front of one roller and in the rear of the other, and a draft tongue H connected to the front bars B between the forward scraper and front harrow section substantially as shown, and for the purpose set forth.

4. In combination with a harrow frame made up of two sections which are centrally hinged to each other, bars B B pivoted to the side bars of the sections adjacent to the hinged connections thereof, said bars carrying rollers and having segmental slots $b'$ to receive headed pins or bolts which pass into the side beams of the harrow frame, and bars carrying scrapers, said bars being carried by the bars B B, substantially as shown, and for the purpose set forth.

5. In combination with a jointed harrow frame having means for holding the sections of said frame in rigid engagement with each other, bars B B carrying rollers, a draft tongue H having connections $h$ rigidly attached to said tongue and pivotally connected to the bars B which carry the forward roller, the rear ends of said connections being downwardly curved for pivotal engagement with the forward side bars B B substantially as shown, and for the purpose set forth.

6. In combination with a harrow and roller constructed substantially as shown, of a jointed harrow frame the rear section of which carries a bifurcated standard $e$ and a loop $e'$, the adjacent section having a loop $e^2$ with which the forward end of a lever E is adapted to engage, said lever passing through the bifurcated standard, substantially as shown, and for the purpose set forth.

7. In a harrow and roller constructed substantially as shown, the combination of the harrow sections hinged to each other, one of said sections carrying a bifurcated standard and loop or guide $e'$, the adjacent section having a loop $e^2$, the lever E adapted to be moved in engagement with the loop $e^2$, said lever carrying a rod F which is operated to engage the standard and hold the parts against movement, substantially as shown, and for the purpose set forth.

8. In a harrow and roller, the combination of a transversely divided harrow frame carrying front and rear rollers, of a seat connected to the harrow frame by standards the lower ends having pivotal connections between seat and harrow frame, the rear standards being pivotally attached at their upper ends to the seat substantially as shown and for the purpose set forth.

9. In a harrow and roller, the combination of a transversely divided harrow frame, the sections being pivotally connected to each other, of a seat having forward standards $i$ which are pivoted at their lower ends to the longitudinal beam of the harrow frame, and standards $i'$ which are pivoted at their upper ends to the seat and at their lower ends to the beam of the harrow frame section, substantially as shown, and for the purpose set forth.

10. In a harrow and roller having a transversely divided harrow frame, of a foot-rest or platform K pivotally attached to the seat support, said platform carrying a bracket M upon which a lever is fulcrumed, and means for connecting said lever to a jointed cross-bar on the harrow frame, substantially as shown, and for the purpose set forth.

11. In a roller and harrow constructed substantially as shown, a platform adapted to rest upon a support L carried by the harrow frame, said platform having means for engaging the pivoted standards $i$, and a lever support carried by said platform, the lever carried thereby engaging with a bar $l$ which is connected with a jointed cross-bar $a'$ carried by the harrow frame adjacent to the hinged parts thereof, substantially as shown, and for the purpose set forth.

12. In a harrow and roller, a harrow frame having a seat mounted on pivoted standards, a platform adapted to bear upon a support carried by the harrow section, the rear end of said platform having means for pivotally engaging the forward seat supporting standards, substantially as shown, and for the purpose set forth.

13. A tooth for harrows having a standard, means for connecting said standard to the harrow frame, said standard having above its lower end rearwardly diverging portions or wings with rearwardly extended ends curved so as to throw the earth inward toward and rear of the center of the standard, substantially as shown.

14. In combination with a spring tooth for harrows, a plate having its upper portion curved while its lower portion is bifurcated and bent rearward so as to diverge, the terminal portions being curved as shown, of a reinforcing plate secured to the tooth, substantially as shown, and for the purpose set forth.

In testimony whereof I affix my signature in presence of two witnesses.

FRANCIS B. HARVEY.

Witnesses:
HARRY G. HOWARD,
ELWOOD DETWILER.